Feb. 26, 1952     H. A. QUIST     2,587,526
FLOATING ROOF TANK GAUGE

Original Filed Oct. 28, 1947     2 SHEETS—SHEET 1

INVENTOR.
HAROLD A. QUIST
BY
*Busser and Harding*
ATTORNEYS

Feb. 26, 1952  H. A. QUIST  2,587,526
FLOATING ROOF TANK GAUGE
Original Filed Oct. 28, 1947  2 SHEETS—SHEET 2
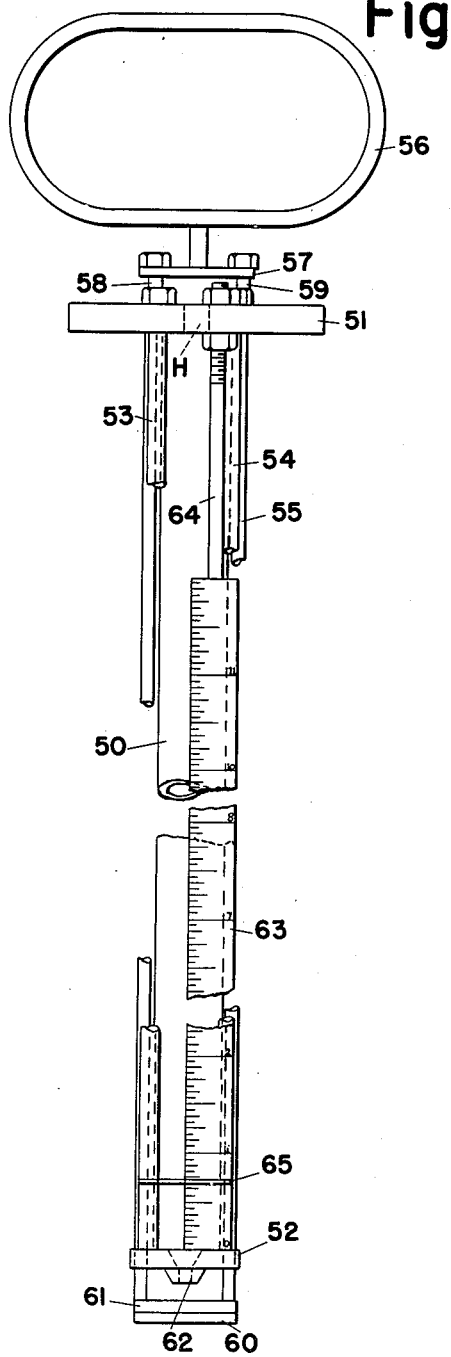
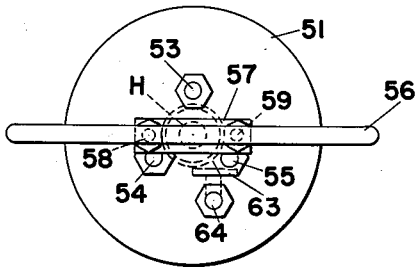
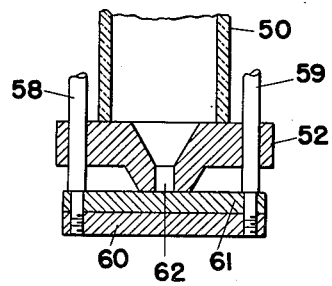
INVENTOR.
HAROLD A. QUIST
BY
ATTORNEYS Patented Feb. 26, 1952

2,587,526

UNITED STATES PATENT OFFICE 2,587,526

FLOATING ROOF TANK GAUGE

Harold A. Quist, Elkton, Md., assignor to Sun Oil Company, Philadelphia, Pa., a corporation of New Jersey Original application October 28, 1947, Serial No. 782,534. Divided and this application July 6, 1949, Serial No. 103,218

5 Claims. (Cl. 73—290)

1

This invention relates to apparatus for measuring the liquid contents of storage tanks and is particularly adapted for use in measuring the contents of storage tanks floating roofs.

The present application is a division of application Serial No. 782,534, filed October 28, 1947, for Floating Roof Tank Gauge.

The principal object of this invention is to measure the liquid contents of floating roof tanks quickly and accurately.

Another object is to provide methods of measurement which are adaptable to tanks of any diameter and to eliminate the error caused by tilted pontoons, especially in the larger tanks.

The invention involves the accurate measurement of the contents of a floating roof storage tank by determining the liquid contents which support the floating roof pontoon and adding to that quantity the measured liquid volume which surrounds the periphery of the pontoon in excess of the first computed amount. The calculation of the two quantities, the sum of which comprises the total liquid contents of the floating roof tank, is obtained from direct readings and reference to conversion tables calculated for the individual tank.

The measurement of the quantity of liquid contained in storage tanks of the floating roof type has been extremely difficult and presented a wide range of variable factors affecting accuracy such as temperatures; volatility of the stored liquid; floating of the pontoon roof due to inherent manufacturing errors, wind, water, snow and other loads; density of the liquid in the tank and friction with the side wall of the mechanical seal often necessary to conserve the contents. The problems arising from these variable conditions have been recognized and devices have been proposed to correct the effects and permit a direct reading of the liquid contents in such tanks on indicating scales. Two types of such devices, one where a manometer reading the pressure on the fluid created by the floating roof and the other where a mechanical float inserted in the pontoon roof, were used, may be mentioned. Both these devices are subject to the error caused by the tilting of the floating roof which was not corrected even assuming that the device was otherwise accurate. By employing the method and apparatus outlined here it is possible to determine the true depth of the liquid to within $\frac{1}{32}$ of an inch.

These and other objects of this invention as may appear from this specification will be best understood from a description of the accompanying drawings which illustrate a preferred embodiment thereof and in which:

Figure 2 is an elevation partly broken away of an ullage rod.

Figure 3 is a plan view of the ullage rod.

Figure 4 is a partially broken away view of the valve member of the ullage rod.

Figure 1:
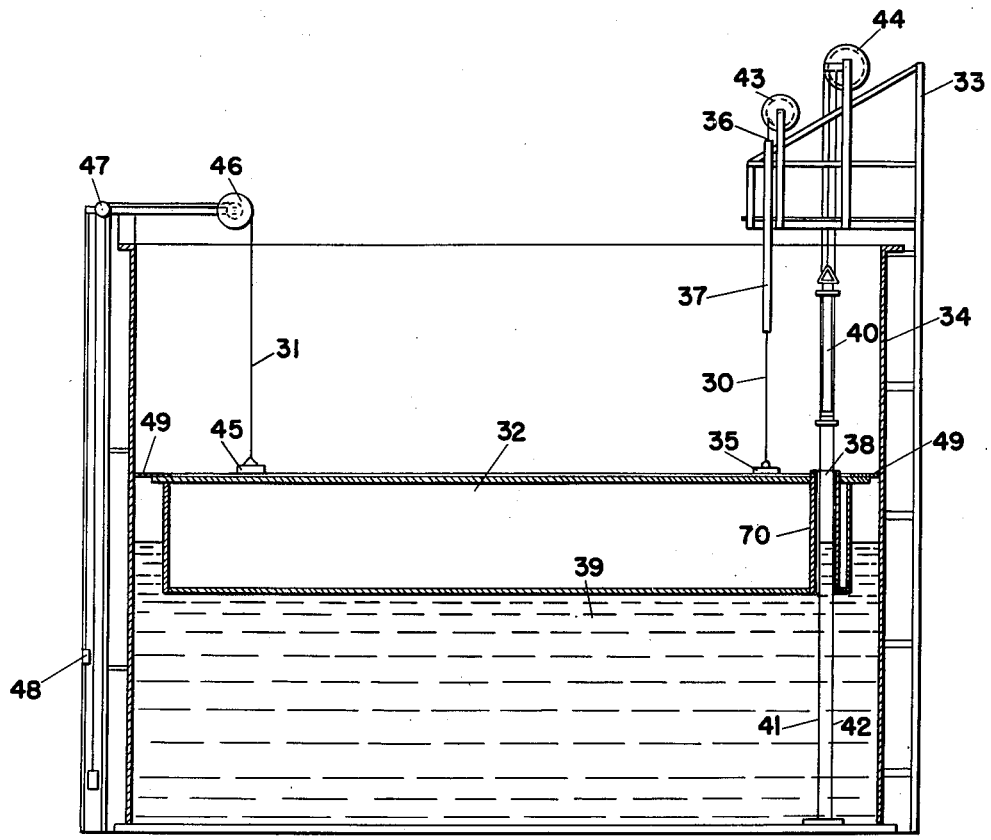
Figure 1 is an elevation in section of the measuring device.

In gauging the contents of storage tanks with floating roofs it is necessary to eliminate the error of measurement which is caused by the tilting of the floating roof pontoon. This is done by either measuring the point of average depth of the floating roof above the bottom of the tank, normally at the center point as disclosed in application Serial No. 782,534 of which this is a division, or by averaging several well spaced readings about the pontoon. Figure 1 shows the application of the principles of these methods of measuring to larger diameter tanks of the floating roof type where it is not practical to construct overhead suspending devices to make the center of the roof pontoon accessible. As an elementary requirement it is still necessary to correct the reading of the elevation of the roof pontoon for any tilt. This has been accomplished by using two tapes 30 and 31 placed diametrically opposite to each other on the floating roof pontoon 32. A greater number of readings around the periphery of the floating roof may be taken, the two, diametrically opposed, in this preferred embodiment being the minimum to achieve the desired result. A platform 33 is mounted above storage tank 34 to enable an observer to read the elevation of point 35 on pontoon 32 as indicated at datum plane 36 on the upper edge of aluminum tube 37.

Diametrically opposite from point 35 where tape 30 is attached to pontoon 32 a second tape 31 is fastened to the pontoon at point 45. This measuring tape is shown as traversing pulleys 46 and 47 to the outside of tank 34 where it is dropped downward to a reading station 48. If it is not desired to use this form of construction, the platform device disclosed above for reading the first tape 30 may be repeated on this side of the tank. Finally, peripheral seals 49 complete the pontoon structure.

The object of the readings taken from the graduated diametrically opposite tapes 30 and 31, or from any greater number of such tapes spaced about the roof preferably at substantially equal distances from its center or periphery, is to determine the average depth of the stored liquid below a level coincident with the center of the lower or submerged face of the roof; that is, the average depth of the liquid below the lower face of the roof, as hereinbefore explained.

Preferably two or more tapes 30, 31 should be located at equal distances from the center of the roof and spaced apart at equal arcuate distances, thus enabling the degree of tilting of the pontoon to be more readily calculated; but this spacing is not essential, since if such variable known distances exist, the degree of tilting of the pontoon is calculable. It is unnecessary to provide more than two diametrically opposite tapes 30, 31. This will be readily understood on the assumption that the tilting is in the direction of a line connecting the two tapes. But even if the tilting should be in a different direction, the readings on the scales 37 form a reliable basis for calculating the average depth of the liquid below a level coincident with the level of the center of the lower face of the pontoon. For example, assuming that the tilting should be at right angles to a line connecting the two tapes, while the two tapes would give the same scale reading, it will be understood that such reading will indicate the depth of the liquid below said level.

Adjacent point 35, as shown (or point 45) the pontoon is formed with a tubular orifice 70 extending through it from top to bottom into which the liquid in the tank is free to flow to partially fill it. The tube and the tape connecting points are spaced apart in the drawing for clarity, but the closer they are the more accurate the calculated liquid quantity. The ullage rod 40 is lowered therein on guide wires 41 and 42. Mounted on the platform 33 are two self-winding wheels 43 and 44 which respectively keep tape 30 tight for elevation readings at point 35 and raises and lowers the ullage rod 40 to take liquid depth reading in gauge tube 38.

Figures 2, 3 and 4 show several views in detail of the structure and operating parts of the ullage rod which typifies the preferred embodiment of the device for use in measuring the contents of a floating roof storage tank as outlined here. It is fully described and claimed in application Serial No. 786,911, filed November 19, 1947. The description is given briefly here in order to disclose a complete and operating appliance. Glass tube 50 is mounted between upper cap 51, vented by hole H, and lower cap 52 and retained in place by said caps held by the three rods 53, 54 and 55. A handle 56 is attached to a yoke 57 which is coupled to valve member 60 by sliding rods 58 and 59. The top of valve member 60 is faced with a gasket 61 which forms a seal with the opening 62 when the ullage rod is closed. A scale 63 is mounted on the glass tube 50 and is held in position against the glass tube by bent rod 64 and brass wire clips 65.

It then remains to determine the quantity of liquid which is above the underside of the floating roof pontoon and then to add this quantity to the already determined volume in the storage tank. The depth to which the pontoon sinks in the stored liquid depends upon many factors, chief of which are original construction details, friction of side seals, external loading and density of the supporting liquid. It will be evident that not all of these factors are constant so that readings must be taken regularly of the depth of the displaced liquid. In the illustrated gauging device this reading is readily obtained by dropping the ullage rod into the gauging tube which is shown in the floating pontoon until the upper bracket 51 rests on the gauging tube. This places the ullage rod in position to measure the liquid above the under side or lower surface of the pontoon. The body of the ullage rod thus suspended, further release of the suspending line will permit the handle 56 to descend, in turn dropping valve member 60 from the opening 62. After a short period of time the line suspending the ullage rod being pulled up, lifts the handle 56 which, in turn, closes the valve member 60 and retains an amount of liquid in the ullage rod equivalent to the depth of liquid which surrounds the pontoon above the under surface. The vent hole H permits the air in the rod to be exhausted allowing the liquid to rise to the true depth. In the case of the larger diameter storage tanks where the gauging tube is placed near the periphery of the floating pontoon, it is necessary to correct the ullage rod reading in proportion to the difference in reading of the diametrically opposed tapes and thereby determine the average liquid height above the under surface of the pontoon. Reference to a prepared conversion table will correct the ullage rod depth to liquid content measure which can readily be added to the originally obtained quantity and an exact reading of the contents of the tank obtained.

The method and apparatus here disclosed affords an accurate measure of the contents of floating roof tanks. The content of the tank which supports the floating roof pontoon can be mathematically determined very closely and found by entering a prepared volume table with the tape measure reading. The greatest source of error in storage tanks of this type has always been in determining the effect of the floating roof pontoon on the storage liquid. This disclosure affords a method and apparatus which once calculated and volume tables prepared will automatically correct for pontoon tilt, manufacturing irregularities, friction, density of the liquid stored, the effect of the elements and other causes which have not been considered prior to this invention.

I claim:

1. A device to measure the liquid contents of a floating roof storage tank comprising in combination, two diametrically opposed tapes adapted to read the height of the floating roof surface in contact with the supporting liquids above the bottom of said tank, pulleys conducting said tapes to convenient reading positions adjacent said tank, a tube open to the liquid of the storage tank in said floating roof proximate one of said two tapes, and an ullage rod for insertion into said tube to determine the depth of the liquid displaced by said floating roof.

2. A liquid measuring device comprising in combination a tank adapted to contain liquid, a floating roof within said tank supported on the surface of the liquid, a gauging tube adjacent the perimeter of said roof open to admit the liquid, roof elevation measuring means positioned in spaced relation about the perimeter of said roof, and an ullage rod removably insertable in said gauging tube to determine the liquid displacement of the roof.

3. A liquid measuring device comprising in combination a tank adapted to contain liquid; a floating roof within said tank supported on the surface of the liquid and responsive to elevation changes of said liquid; roof elevation measuring means including a number of graduated tapes cooperating with the perimeter of said roof at spaced intervals adjusted to read the elevation of the liquid contact surface of said roof above the bottom of the tank; separate datum points for each of said tapes positioned in fixed relation to said roof and said tank, adapted to receive said tapes in measuring relation; a gauging tube open to the liquid positioned in said floating roof adjacent the perimeter thereof; and an ullage rod removably insertable in said gauging tube to determine the liquid displacement of the roof.

4. A device to measure the liquid contents of a floating roof storage tank comprising in combination means for measuring the quantity of liquid below the liquid contact surface of said floating roof at selected diametrically opposed points thereon, a gauge tube open to the stored liquid through the floating roof proximate one of said selected points, and an ullage rod insertable in the gauge tube to measure the depth of the liquid displaced in floating said roof at said selected point.

5. A liquid measuring device for tanks having a floating roof within said tank supported on the surface of the liquid comprising a gauging tube in said roof open to the liquid in the tank and positioned adjacent the periphery thereof, a cantilever platform extending from the wall of said tank over said gauging tube, an ullage rod adapted to be suspended from said cantilever platform and enter said gauging tube to measure the displaced liquid elevation therein, a plurality of graduated tapes attached in spaced relation around the periphery of said floating roof beginning adjacent said gauging tube and extended to convenient reading positions adjacent said tank, the tape adjacent the gauging tube extending to a reading station on said cantilever platform.

HAROLD A. QUIST.

REFERENCES CITED

The following references are of record in the file of this patent:

UNITED STATES PATENTS

| Number | Name | Date |
|---|---|---|
| 2,117,185 | Lynskey | May 10, 1938 |
| 2,237,461 | Tokeim | Apr. 8, 1941 |
| 2,486,823 | Cranmer | Nov. 1, 1949 |